United States Patent [19]
Hallin

[11] Patent Number: 5,184,562
[45] Date of Patent: Feb. 9, 1993

[54] LAKE DOCK POLE ACCESSORY SYSTEM

[76] Inventor: Mark P. Hallin, 1305 Elmwood Ave., Mound, Minn. 55364

[21] Appl. No.: 867,174

[22] Filed: Apr. 10, 1992

[51] Int. Cl.⁵ .............................................. B63B 59/02
[52] U.S. Cl. .................................... 114/219; 114/263; 405/215
[58] Field of Search ........................ 114/219, 263, 364; 14/76; 405/215, 216, 221

[56] References Cited

U.S. PATENT DOCUMENTS

| | | | |
|---|---|---|---|
| 4,964,760 | 10/1990 | Hartman | 405/215 |
| 4,968,182 | 11/1990 | Westwell | 405/216 |
| 5,106,237 | 4/1992 | Meldrum | 405/221 |

Primary Examiner—Jesus D. Sotelo
Attorney, Agent, or Firm—Merchant, Gould, Smith, Edell, Welter & Schmidt

[57] ABSTRACT

A bumper accessory for use with a lake dock pole when the pole is installed with the lake dock. Such poles when installed typically have an upper portion which protrudes above the top surface of the lake dock. The pole further typically has a boat-mooring surface against which a boat could be moored. The bumper accessory of the present invention comprises a bumper member for covering a predetermined length of the boat-mooring side of the pole. A housing portion defines an inner cavity for concealing the upper portion of the pole, the housing portion being attached to the bumper member. The housing portion has a lower surface which mates with the top surface of the lake dock. Structure for securing the bumper member or the housing to the pole is also included.

33 Claims, 6 Drawing Sheets

LAKE DOCK POLE ACCESSORY SYSTEM

BACKGROUND OF THE INVENTION

The present invention relates to lake docks and more particularly to a lake dock pole accessory system comprising a bumper and a housing for use in connection with a lake dock pole.

Boats often have an aluminum gunnel molding in which a rubber or plastic strip is secured in order to provide a surface against which to rub without damaging the boat. However, metal dock posts sometimes stick to such rubber or plastic strip material and can even pull it out of the gunnel, causing the dock post to then rub against the aluminum gunnel molding. Alternatively, other boat bearing surfaces also typically wear against metal or other hard-surfaced dock posts, since most boat surfaces which protrude to potentially rub against dock poles are either softer than metal or have as a minimum a surface which could be scratched or damaged by a typical dock post.

It is known that a bumper of some sort between the boat and a metal or other dock post is desirable when mooring a boat against the boat-mooring side of a dock post in order to prevent such damage. Boaters typically use portable bumpers which are either strung from the boat or the dock post in an effort to keep the bumper between the boat and the dock post so that no damage occurs to the boat, such as when waves on the lake move the boat about. Those skilled in the art will be readily familiar with the difficulty of keeping such bumpers in place or at the correct level. Boaters have also used vehicle tires strung over lake dock posts in an effort to form a bumper. Frequently, however, these tires are at the wrong level, depending upon the boat being moored at the time or upon the degree of motion being subjected to the boat by waves in the lake.

In addition, persons familiar with lake docks recognize that lake dock poles, when installed with the dock in a lake, tend to have an upper portion which protrudes above the top surface of the lake dock at a height which varies from pole to pole. In such situations, there is a lack of uniform appearance at each pole portion of the dock.

In addition, lake dock poles typically are not made of sufficient length to extend far enough above the top surface of the lake dock to provide a convenient and uniform attachment height for a hand rail to be used along the length of the dock for safety or appearance reasons.

Furthermore, lake dock poles typically do not incorporate a means for readily incorporating lighting at the location of the pole.

Also, typical lake dock systems frequently do not incorporate a system for keeping the deck portions of a lake dock secured down to the hardware that supports the deck portions. This can cause significant difficulties when large waves arise, or when lake levels quickly rise as a result of rain storms or the like. In such situations, the decks can be floated away from the docks.

These and other shortcomings of lake dock poles or lake dock systems installed with lake dock poles are readily overcome by the present lake dock pole accessory system.

SUMMARY OF THE INVENTION

The present invention is a bumper accessory for use with a lake dock pole when the pole is installed with the lake dock. Such poles when installed typically have an upper portion which protrudes above the top surface of the lake dock. The pole further typically has a boat-mooring surface against which a boat could be moored. The bumper accessory of the present invention comprises a bumper member for covering a predetermined length of the boat-mooring side of the pole. A housing portion defines an inner cavity for concealing the upper portion of the pole, the housing portion being attached to the bumper member. The housing portion has a lower surface which mates with the top surface of the lake dock. Structure for securing the bumper member or the housing to the pole is also included.

DETAILED DESCRIPTION OF THE PREFERRED EMBODIMENTS

Figure 1:
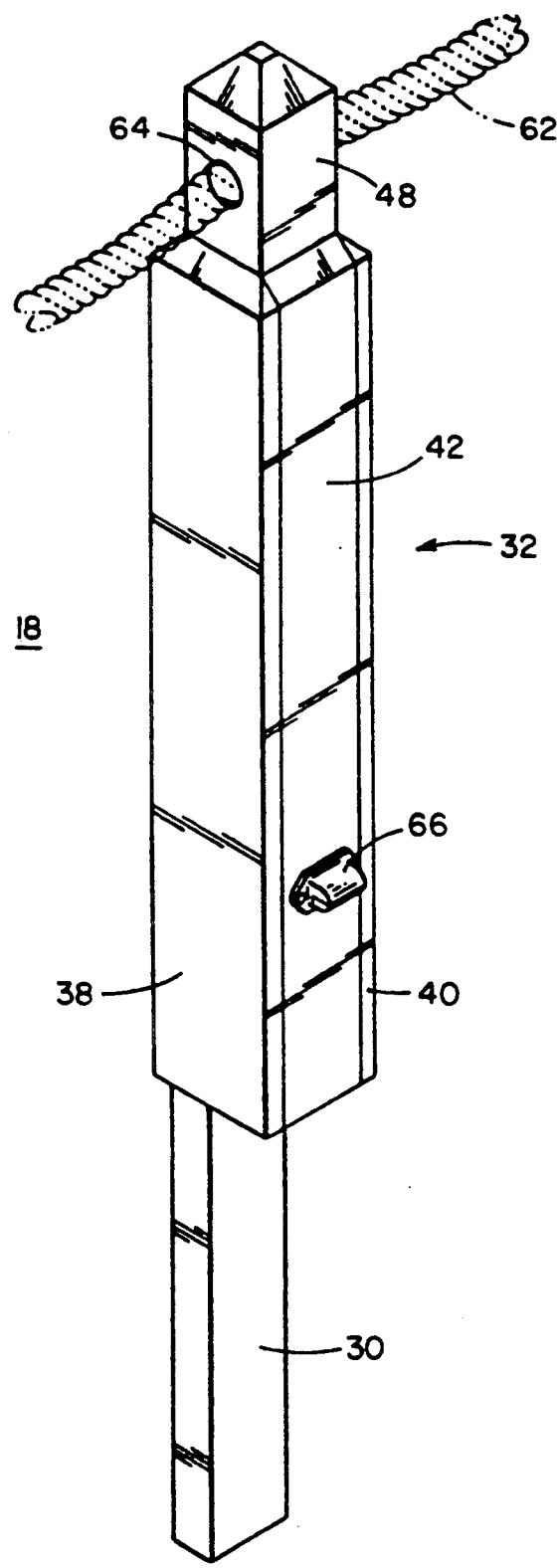
FIG. 1 is a top, front, and left side perspective of a preferred embodiment of the present invention.

The present invention is a lake dock pole accessory system. More particularly, the present invention is a bumper accessory for use with a lake dock pole 20 when the pole is installed with a lake dock such as 22. A lake dock pole 20 when installed has an upper portion which protrudes above the top surface 24 of the lake dock. Poles 20 typically have a boat-mooring surface 26 against which a boat could be moored. When made of metal, poles 20 are typically round and thought of as having an outside diameter, although it is recognized by those skilled in the art that metal or other lake dock poles compatible with the present invention could have other external configurations. Lake dock poles 20 may be driven into the bottom of the lake, may rest on discs such as 28 or may be supported by other systems, such as floating barrels or tire-based structures which roll into and out of the lake.

The bumper accessory of the present invention comprises a bumper member 30 for covering a predetermined length of the boat-mooring side of poles 20. A typical length of bumper member 30 is in the range of 54 inches, although those skilled in the art will recognize that substantial variation can be made in the length of bumper members compatible with the present invention. Bumper members 30 typically are configured to extend both above and below the top surface 24 of a lake dock, although variation of this aspect is possible.

A housing portion 32 defines an inner cavity 34 (see, for example, FIGS. 6 and 7) for concealing the upper portion of poles 20, housing portion 32 being attached to bumper member 30. Housing portion 32 has a lower surface 72 which mates with top surface 24 of the lake dock.

The present invention further comprises means for securing at least one of the bumper member or the housing portion to pole 20. This means for securing may comprise a set screw 36 (see FIG. 2), which will be discussed further below. Means for securing bumper accessory 18 can be very important in a variety of situations. For example, in the event of large waves or a quickly rising water level, the deck portions of the lake dock, which in typical installations are not secured to the framework of the dock, may be floated away or become misaligned with the remaining portions of the dock system. However, with lower surface 72 of housing portion 32 being mated to the upper surface of the lake dock sections, the means for securing the housing portion or bumper member onto pole 20 secures the lake dock deck portions in place in such high water level conditions.

Bumper member 30 typically comprises a wooden member, which preferably comprises cedar or redwood material. Such wooden member bumpers are relatively soft and give to some extent against a boat bearing surface rubbing against the member. In addition, the applicant has found that such wooden bumper members do not typically stick to rubber or plastic strips which are sometimes found along the boat-mooring bearing surfaces of boats. As previously indicated, such strips can be pulled away from an aluminum or other gunnel mounting system by the natural adhesion that sometimes occurs between such strips and metal lake dock poles.

Figure 6:
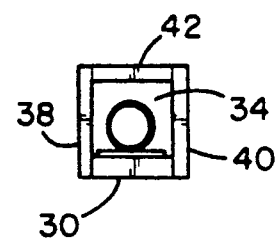
FIGS. 6 and 7 show bottom plan views of two alternative preferred embodiments of the present invention.
Figure 7:
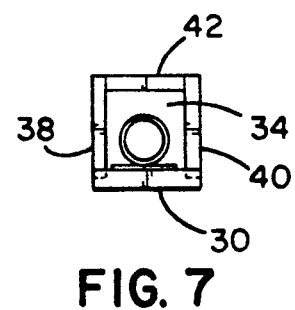
Figure 12:
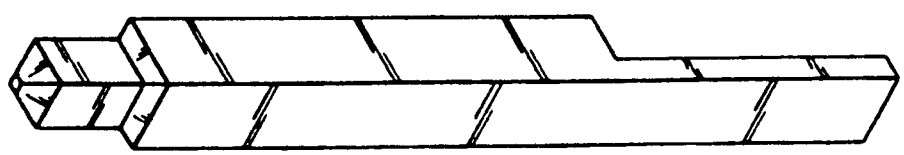
FIGS. 10, 11 and 12 show top, back, and left side perspective views of three alternative embodiments of the present invention.
Figure 11:
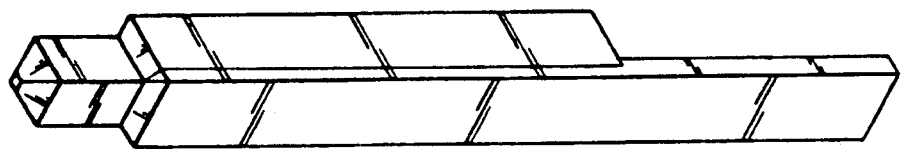
Figure 10:
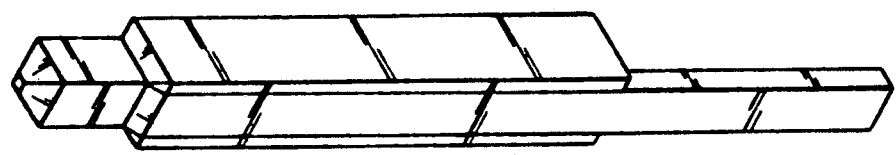

Wooden bumper members compatible with the present invention may comprise a lateral cross-sectional size substantially the same size as a standard piece of 2×4 lumber (having a nominal thickness of 1½ inches and a nominal width of 3½ inches), as is illustrated in the preferred embodiments of FIGS. 1, 3, 4, 6, 9, 10, and 13, or a standard piece of 2×6 lumber (having a nominal thickness of 1½ inches and a nominal width of 5½ inches), such as is illustrated in the preferred embodiments of FIGS. 7, 11, and 12. Those skilled in the art will recognize that other standard or modified sizes of lumber or materials other than lumber may be used to form bumper members 30.

In preferred embodiments which are formed substantially of wooden members, housing portion 32 typically comprises first and second side boards 38 and 40 respectively secured to the bumper member, as well as a third side board 42 secured to the first and second side boards, the third side board being parallel to and spaced away from bumper member 30.

Figure 3:
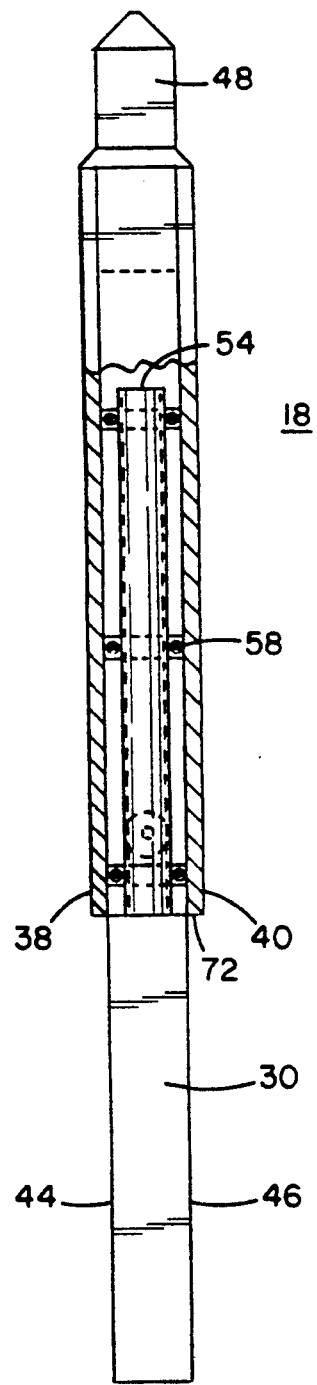
Figure 4:
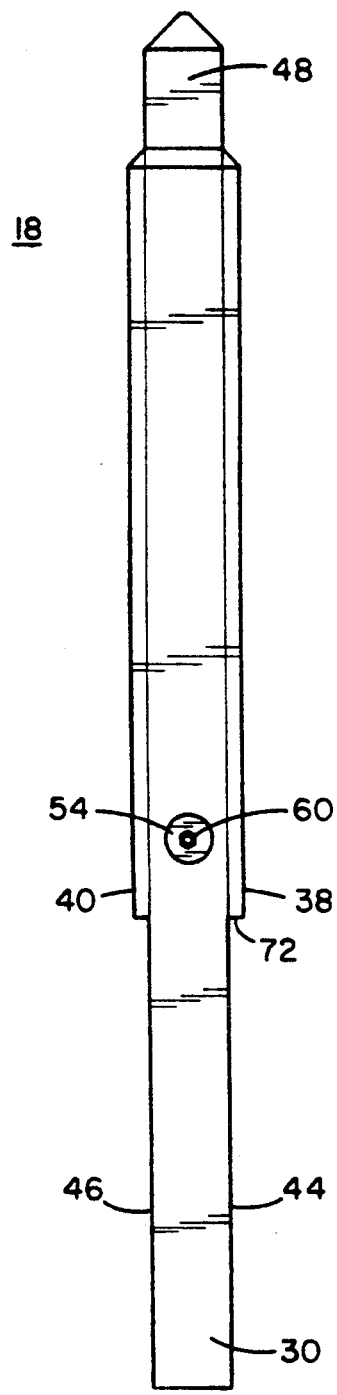
FIG. 4 shows a rear elevational view of a preferred embodiment of the present invention.
Figure 5:
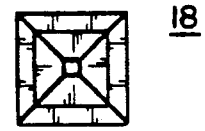
FIG. 5 shows a top plan view of a preferred embodiment of the present invention.

In embodiments wherein bumper member 30 comprises a wooden member having a lateral cross-sectional size substantially the same size as a standard piece of 2×4 lumber, the first and second side boards 38 and 40 may be secured to first and second edges 44 and 46 of bumper member 30, as is illustrated in FIGS. 3 and 6. Furthermore, in such configurations, third side board 42 may comprise a cross-sectional configuration comprising a piece of standard 1×4 lumber (having a nominal thickness of ¾ inch and a nominal width of 3½ inches), and first and second side boards 38 and 40 may have a cross-sectional size substantially the same as a standard piece of 1×6 lumber (having a nominal thickness of ¾ inch and a nominal width of 5½ inches). Those skilled in the art will recognize that many other sizes and arrangements for securing such pieces together could be used.

If the present bumper accessory is configured of wooden members, such members may be secured together by many means, one example of which is the use of power-drivers, screws or pneumatically driven connectors such as nails or staples and exterior construction adhesive such as that sold under the trademark PL400 ® heavy duty subfloor adhesive manufactured by Chemrex Inc. (Contech Brands) of Minneapolis, Minnesota 55435.

If the present bumper accessory includes a wooden bumper member 30 which comprises a lateral cross-sectional size substantially the same as a standard piece of 2×6 or similar lumber, first and second side boards 38 and 40 may be rabbeted into bumper member 30 (using, for example, ¾ inch × ¾ inch rabbets), as is illustrated by way of example in FIGS. 7 and 11.

First, second and third side board members 38, 40, and 42 may have a length in the range of 36 inches, although those skilled in the art will recognize that many other lengths may be appropriate in varying circumstances.

Figure 2:
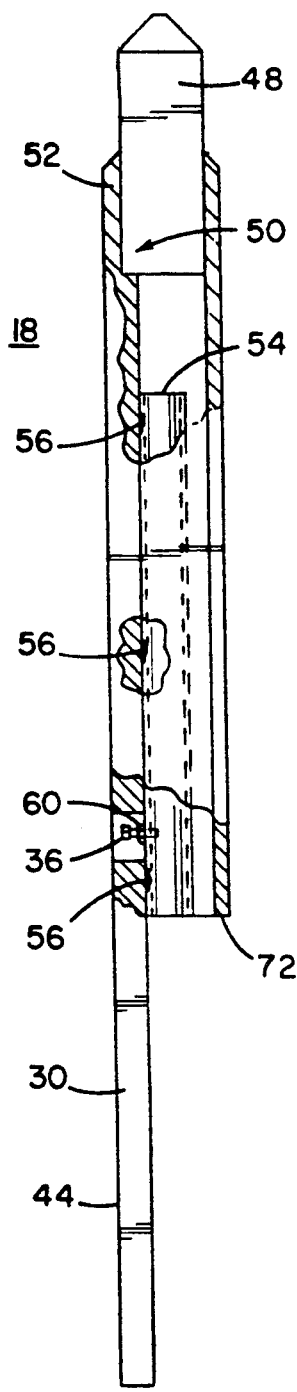
FIGS. 2 and 3 show partial cross-section side and front elevational views of a preferred embodiment of the present invention.

In embodiments which are formed of wooden members, the upper portion 48 may comprise an upper wooden member having a lateral cross-sectional size substantially the same as a standard piece of 4×4 lumber (nominally 3½ inches by 3½ inches), although those skilled in the art will recognize that many other standard or specialized sizes could be used. In such an embodiment, bumper member 30 may comprise a rabbeted or thinned portion 50 such as is illustrated in FIG. 2. Thinned portion 52 may have an approximate thickness of ¾ inch, thus leaving the appearance this region is formed of lumber of the same thickness as used in first, second and third side portions 38, 40 and 42. Other arrangements and materials may be used for upper portion 48 of the present bumper accessory.

In the preferred embodiment illustrated, means for securing the bumper member 30 on the housing portion 32 or both to lake dock pole 20 may comprise a pipe 54 having an inside diameter larger than the outside diameter of lake dock poles 20. This configuration of the present invention has been found particularly useful when lake dock poles 20 are formed of metal. While such lake dock poles typically have an external configuration which is round, other external configurations of metal lake dock poles are possible, while still being thought of as having outside diameter defining essentially a circular envelope within which the outside configuration of the lake dock pole would be formed. Those skilled in the art will recognize that metal dock poles 20 are typically formed of galvanized or other steel pipe having a nominally-specified internal diameter of 1½ inches. In such an embodiment, pipe 54 may also comprise steel pipe, and may comprise pipe having a nominally-specified inside diameter of 2 inches. Such nominally sized 2 inch pipe 54 works nicely to fit over lake dock poles 20 formed of 1½ inch nominally-sized pipe Pipe 54 may have a length of 16 inches, although other lengths may be suitable, depending upon the circumstances at hand. In the preferred embodiment, pipe 54 is formed of metal and is secured to bumper member 30 by three metal strips 56, which may be welded to metal pipe 54 and then fastened to bumper member 30, such as by screws 58 passing through apertures in strips 56. Metal strips 56 are typically ⅛ inch thick and ½ by 3 inches in size, although many other thicknesses could be used.

The means for securing bumper accessory 18 may also comprise a set screw 36 coupled to pipe 54 such as by a nut 60 welded to pipe 54. In such an arrangement, set screw 36 passes through an aperture aligned with the threaded aperture of nut 60. Using a set screw 36 having a thread matching that of nut 60, set screw 36 may then be tightened into lake dock poles 20, thus securing the vertical position of bumper accessory 18 on dock poles 20. Such a means for securing bumper accessory 18 also prevents a twisting motion of the bumper accessory when the boat is rocked laterally back and forth in a twisting manner against the boat mooring surface of bumper member 30.

Other embodiments could be configured in order to arrive at a means for securing bumper accessory 18 to metal dock pole 20. Alternately, for example, the present or similar bumper accessory could be configured of a solid piece of material such as a wooden member comprising a lateral cross-section size substantially the same as a standard piece of 6×6 lumber (nominally 5½ by 5½ inches) with a hole being drilled into the lower end of the housing portion, the hole having a size for accepting a dock pole 20 into the interior of the housing portion. Such an embodiment could also use a set screw or other mechanism for maintaining the vertical position of the bumper member and housing portion with respect to the lake dock pole.

By way of illustrating another alternative embodiment, lake dock poles 20 can be configured of wooden members, such as wooden poles having a lateral cross sectional size substantially the same as a standard piece of 4×4 lumber (nominally 3½ inches by 3½ inches) which, for example, could be driven into the bottom of a lake. When using the present bumper accessory invention with such lake dock poles, removing pipe 54 and its corresponding metal strips 56 from the embodiments shown would enable housing portion 32 to be slipped directly over the upper portion of the poles. Means for securing such a bumper accessory 18 onto such lake dock poles could include means as simple as driving one or more nails through housing portion 32 or bumper member 30 into the lake dock pole.

Figures 8, 9:
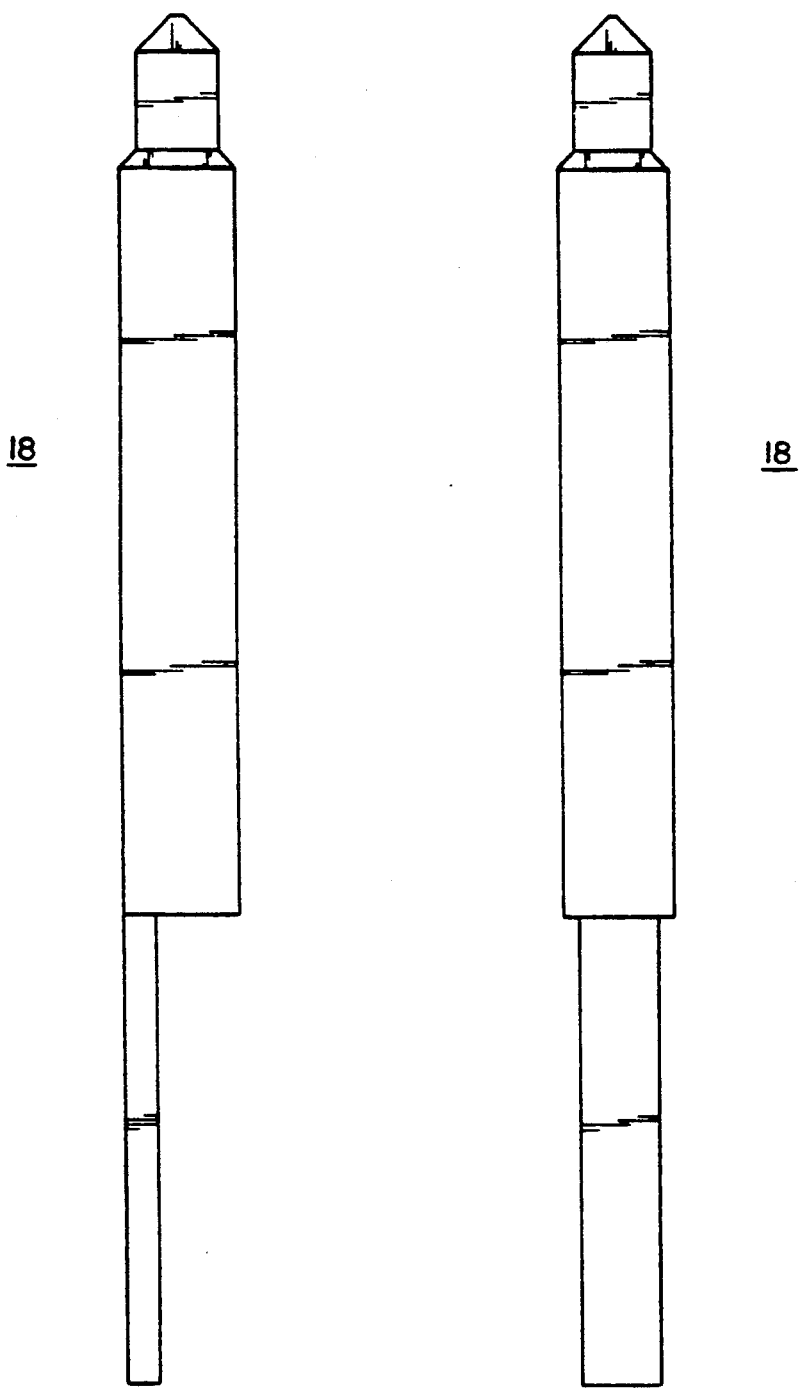
FIGS. 8 and 9 show left side and front elevational views of a preferred embodiment of the present invention.

In addition to forming the present invention out of wooden members, the present bumper accessory may be formed substantially of plastic, fiberglass or other materials, such embodiments potentially having the external appearance such as those shown in FIGS. 8, 9, and 12, it being noted that such embodiments have been illustrated without butt or rabbet joint interfaces being shown in the figures. For bumper accessories 18 formed partially or substantially of plastic, fiberglass, or other non-wood materials, a simulated wood grain finish may be used. On the other hand, as with embodiments formed of wooden members, the natural material color may be left showing, or protective coatings such as paint or other finishes may be applied.

Figure 13:
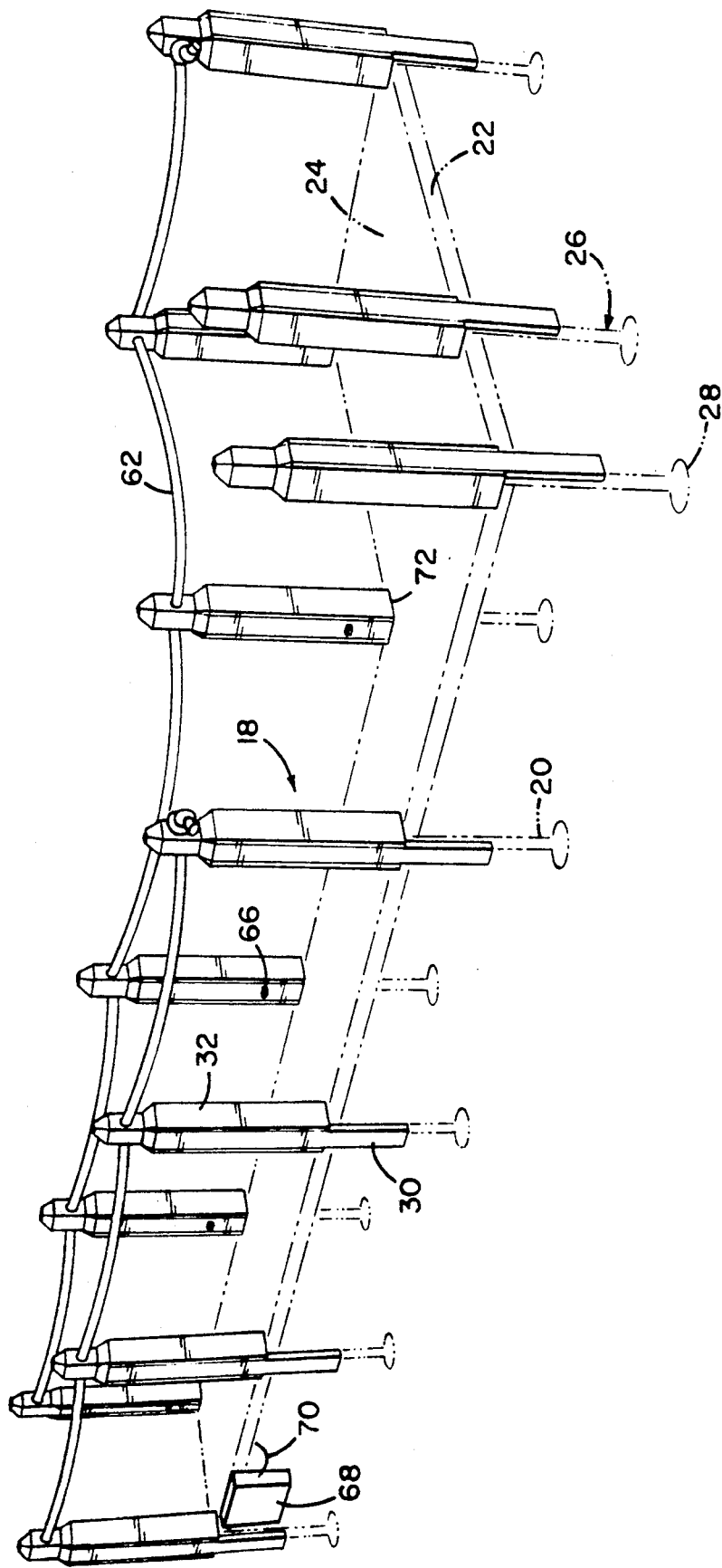
FIG. 13 shows two embodiments of the present invention installed in a typical lake dock configuration.

The upper portion of the present bumper accessory, such as upper portion 48, may comprise a structure (e.g., an eyebolt or other apparatus) which defines an aperture for receiving a rope 62 to be used between at least some lake dock poles 20 as a handrail. In the preferred embodiment, upper portion 48 of the present bumper accessory includes a 1⅞ inch hole 64 formed in the upper portion, such as by drilling a 1⅞ inch diameter hole in an upper wooden member. A hole of this size has been found to accept 1½ inch manilla rope, such as that sold by Hooven Allison Rope Co., 677 Cincinnati Avenue, Xenia, Ohio. This rope has an attractive spiral appearance and has been found acceptable for use as a handrail in connection with the present bumper accessory invention. Other sizes and types of rope or other material could also be used for a handrail material and positioned between bumper accessories 18. As can be seen in FIG. 13, it is typical to provide some bumper accessories 18 without a hole 64 being formed in upper portion 48 for a rope or other handrail 62. Such bumper accessories are typically placed on dock poles along side of which a boat is to be moored. With such a configuration, people can easily enter and exit a boat without having to climb over or under rope or other handrail 62.

The present bumper accessory may comprise if desired a light 66 located, for example, on an exterior surface such as third side board 42 as is illustrated in FIGS. 1 and 13. Lights 66 are typically low-voltage lights, which may be powered by a power supply 68 and conventional power-supply wire 70, with power supply 68 typically being mounted on or near dock 22 and wire 70 typically being strung underneath dock 24 and up into the lower end of bumper accessories 18 for connection to lights 66. Lights 66 may be mounted approximately 12 inches above upper surface 24 of dock 22, although other elevations may be appropriate, depending upon the circumstances at hand. Although many lights 66 may be suitable, a hooded interior light manufactured by Peterson Manufacturing, 4200 East 135th Street, Grand View, Mo. 64030 (telephone (816) 765-2000) under manufacture number 434 has been found suitable. This hooded light is powered by 12 volts and is a highly polished, chrome-plated brass unit which is hooded to shield against upward glare. It is surface mounted on 2 inch centers and includes a separate ground wire. The overall dimensions of this light are 2-9/16 inch by 1 inch by 1-3/16 inch. Light 66 in the embodiment shown is mounted with two screws and it may also be beneficial to incorporate a sealing adhesive between the back surface of light 66 and its bumper accessory mounting surface, in order to prevent invasion of lake water or other moisture. Those skilled in the art will recognize that many other low voltage or other lights may be used and that other power supplies may be used, including solar power.

The present invention is to be limited only in accordance with the scope of the appended claims, since others skilled in the art may devise other embodiments still within the limits of the claims. For example, the overall general silhouette and appearance of the preferred embodiments illustrated need not be present in order to infringe the claims which follow below. Furthermore, as has been indicated, many different sizes, materials, securing mechanisms, and other aspects of the invention may be varied and still be covered by the following claims.

What is claimed is:

1. A bumper accessory for use with a lake dock pole when the pole is installed with a lake dock, the pole when installed having an upper portion which protrudes above the top surface of the lake dock, the pole further having a boat-mooring surface against which a boat could be moored, the bumper accessory comprising:

a. a bumper member for covering a predetermined length of the boat-mooring side of the pole;

b. a housing portion which defines an inner cavity for concealing the upper portion of the pole, the housing portion being attached to the bumper member, the housing portion having a lower surface which mates with the top surface of the lake dock; and c. means for securing at least one of the bumper member and the housing portion to the pole.

2. The bumper accessory of claim 1 wherein the bumper member comprises a wooden member.

3. The bumper accessory of claim 2 wherein the wooden member comprises a lateral cross-sectional size substantially the same as a standard piece of 2×4 lumber.

4. The bumper accessory of claim 3 wherein at least one of the wooden member and the housing portion comprise cedar or redwood material.

5. The bumper accessory of claim 3 wherein the housing portion comprises first and second side boards secured to edges of the bumper member and a third side board secured to the first and second side boards, the third side board being parallel to and spaced away from the bumper member.

6. The bumper accessory of claim 2 wherein the wooden member comprises a lateral cross-sectional size substantially the same as a standard piece of 2×6 lumber.

7. The bumper accessory of claim 2 wherein the housing portion comprises first and second side boards secured to the bumper member, the housing portion further comprising a third side board secured to the first and second side boards, the third side board being parallel to and spaced away from the bumper member.

8. The bumper accessory of claim 1 wherein:

a. the lake dock pole comprises at least nominally an outside diameter; and b. the means for securing comprises:

i. a pipe having an inside diameter larger than the outside diameter of the lake dock pole, the pipe being secured inside the housing portion to at least one of the bumper member and the housing portion; and ii. a set screw coupled to the pipe for maintaining the vertical position of the pipe with respect to the lake dock pole.

9. The bumper accessory of claim 1 wherein an upper portion of one of the housing portion and the bumper member comprises a structure defining an aperture for receiving a rope to be used between lake dock poles as a hand rail.

10. The bumper accessory of claim 1 wherein the housing portion comprises and upper portion comprising an upper wooden member having a lateral cross-sectional size substantially the same as a standard a piece of 4×4 lumber.

11. The bumper accessory of claim 10 wherein the upper wooden member defines an aperture for receiving a rope to be used between lake dock poles as a hand rail.

12. The bumper accessory of claim 1 wherein the housing portion comprises an exterior surface formed of a plastic material.

13. The bumper accessory of claim 12 wherein the plastic material comprises a simulated wood grain exterior finish.

14. The bumper accessory of claim 1 wherein the housing portion comprises a low-voltage light positioned for illuminating the upper surface of the lake dock.

15. A lake dock system, comprising:

a. at least one lake dock portion comprising a deck configured to be supported in a lake by lake dock poles;

b. lake dock poles configured to interface with the deck for supporting the deck above the normal high water level of the lake, each pole being configured so that, when installed in the lake with the deck, the pole has an upper portion which protrudes above the top surface of the deck, each pole further having a boat-mooring surface against which a boat could be moored; and c. at least a portion of the poles being configured with a bumper accessory, each bumper accessory on a corresponding pole comprising:

i. a bumper member for covering a predetermined length of the boat-mooring side of the corresponding pole;

ii. a housing portion which defines an inner cavity for concealing the upper portion of the corresponding pole, the housing portion being attached to the bumper member, the housing portion having a lower surface which mates with the top surface of the deck; and iii. means for securing at least one of the bumper member and the housing portion to the corresponding pole.

16. The lake dock system of claim 15 wherein each bumper member comprises a wooden member.

17. The lake dock system of claim 16 wherein the wooden member comprises a lateral cross-sectional size substantially the same as a standard piece of 2×4 lumber.

18. The lake dock system of claim 17 wherein at least one of the wooden member and the housing portion comprise cedar or redwood material.

19. The lake dock system of claim 16 wherein the wooden member comprises a lateral cross-sectional size substantially the same as a standard piece of 2×6 lumber.

20. The lake dock system of claim 19 wherein the housing portion comprises first and second side boards secured to the bumper member, the housing portion further comprising a third side board secured to the first and second side boards, the third side board being parallel to and spaced away from the corresponding bumper member.

21. The lake dock system of claim 15 wherein each housing portion comprises first and second side boards secured to edges of the corresponding bumper member and a third side board secured to the first and second side boards, the third side board being parallel to and spaced away from the corresponding bumper member.

22. The lake dock system of claim 15 wherein each means for securing comprises:

a. the lake dock pole comprises at least nominally an outside diameter; and b. the means for securing comprises:

i. a pipe having an inside diameter larger than the outside diameter of the corresponding lake dock pole, the pipe being secured inside the corresponding housing portion to at least one of the corresponding bumper member and the corresponding housing portion; and ii. a set screw coupled to the pipe for maintaining the vertical position of the pipe with respect to the corresponding lake dock pole.

23. The lake dock system of claim 15 wherein:

a. an upper portion of at least a plurality of the housing portions or the bumper members comprise a structure defining an aperture for receiving a rope to be used between the at least a plurality of corresponding lake dock poles as a hand rail; and b. a rope is strung between the apertures.

24. The lake dock system of claim 15 wherein each housing portion comprises and upper portion comprising an upper wooden member having a lateral cross-sectional size substantially the same as a standard a piece of 4×4 lumber.

25. The lake dock system of claim 24 wherein:

a. at least a plurality of the upper wooden members each define an aperture for receiving a rope to be used between the at least a plurality of corresponding lake dock poles as a hand rail; and b. a rope is strung between the apertures.

26. The lake dock system of claim 15 wherein each housing portion comprises an exterior surface formed of a plastic material.

27. The lake dock system of claim 26 wherein the plastic material comprises a simulated wood grain exterior finish.

28. The lake dock system of claim 15 wherein at least a plurality of housing portions comprise a low-voltage light positioned for illuminating the top surface of the deck.

29. A bumper accessory for use with a lake dock pole when the pole is installed with a lake dock, the pole when installed having an upper portion which protrudes above the top surface of the lake dock, the pole further having a boat-mooring surface against which a boat could be moored, the pole also having an outside diameter, the bumper accessory comprising:

a. a bumper member for covering a predetermined length of the boat-mooring side of the pole, the bumper member comprising a wooden member having a lateral cross-sectional side substantially the same size as a standard piece of lumber selected from the group consisting essentially of a standard piece of 2×4 or 2×6 lumber; and b. a housing portion which defines an inner cavity for concealing the upper portion of the pole, the housing portion being formed in part by an upper portion of the bumper member, the housing portion having a lower surface which mates with the top surface of the lake dock, the housing portion comprising:

i. first and second side boards secured to the bumper member;

ii. a third side board secured to the first and second side boards, the third side board being parallel to and spaced away from the bumper member;

iii. an upper portion comprising an upper wooden member having a lateral cross-sectional size substantially the same as a standard piece of 4×4 lumber; and iv. means for securing at least one of the bumper member and the housing portion to the pole, the means for securing comprising:

(1) a pipe having an inside diameter larger than the outside diameter of the lake dock pole, the pipe being secured inside the housing portion to at least one of the bumper member and the housing portion; and (2) a set screw coupled to the pipe for maintaining the vertical position of the pipe with respect to the lake dock pole.

30. The bumper accessory of claim 29 wherein at least one of the bumper member and the housing portion comprise cedar or redwood material.

31. The bumper accessory of claim 29 wherein an upper portion of the housing portion or the bumper member comprises a structure defining an aperture for receiving a rope to be used between lake dock poles as a hand rail.

32. The bumper accessory of claim 29 wherein the upper wooden member defines an aperture for receiving a rope to be used between lake dock poles as a hand rail.

33. The bumper accessory of claim 29 wherein the housing portion comprises a low-voltage light positioned for illuminating the upper surface of the lake dock.

* * * * *